(12) United States Patent
Mergener et al.

(10) Patent No.: US 12,728,726 B2
(45) Date of Patent: Sep. 8, 2026

(54) OUTDOOR POWER EQUIPMENT CHARGING TRAILER

(71) Applicant: BRIGGS & STRATTON, LLC, Wauwatosa, WI (US)

(72) Inventors: Matthew Mergener, Wauwatosa, WI (US); Bryce Metcalf, New Berlin, WI (US); Nicholas Joseph Zeidler, Wauwatosa, WI (US)

(73) Assignee: BRIGGS & STRATTON, LLC, Wauwatosa, WI (US)

( * ) Notice: Subject to any disclaimer, the term of this patent is extended or adjusted under 35 U.S.C. 154(b) by 470 days.

(21) Appl. No.: 18/231,016

(22) Filed: Aug. 7, 2023

(65) Prior Publication Data

US 2024/0042861 A1 Feb. 8, 2024

Related U.S. Application Data

(60) Provisional application No. 63/395,482, filed on Aug. 5, 2022.

(51) Int. Cl.

| | |
|---|---|
| ***B60L 1/00*** | (2006.01) |
| ***B60L 58/12*** | (2019.01) |
| ***B60R 16/033*** | (2006.01) |
| ***B62D 59/04*** | (2006.01) |
| ***H02J 7/70*** | (2026.01) |
| ***H02J 50/10*** | (2016.01) |

(52) U.S. Cl.

CPC ................. *B60L 1/00* (2013.01); *B60L 58/12* (2019.02); *B60R 16/033* (2013.01); *B62D 59/04* (2013.01); *H02J 7/731* (2026.01); *H02J 7/751* (2026.01); *H02J 50/10* (2016.02); *B60L 2200/28* (2013.01)

(58) Field of Classification Search

CPC ........ B60L 1/00; B60L 58/12; B60L 2200/28; B60L 53/14; B60R 16/033; B62D 59/04; H02J 7/0044; H02J 7/0045; H02J 50/10; H02J 7/0013; H02J 7/0042

See application file for complete search history.

(56) References Cited

U.S. PATENT DOCUMENTS

| | | | | |
|---|---|---|---|---|
| 2,766,898 A | | 10/1956 | Risner | |
| 4,735,454 A | | 4/1988 | Bernard | |
| 9,079,505 B1 | | 7/2015 | Hyde et al. | |
| 2008/0185197 A1 | | 8/2008 | Nakamura et al. | |
| 2010/0187029 A1 | * | 7/2010 | Young ...................... | B60K 6/46 180/65.285 |
| 2012/0303397 A1 | | 11/2012 | Prosser | |
| 2012/0305662 A1 | | 12/2012 | Miyano | |
| 2013/0175819 A1 | | 7/2013 | Hindle | |

(Continued)

FOREIGN PATENT DOCUMENTS

| | | | | |
|---|---|---|---|---|
| KR | 200484860 Y1 | * | 11/2017 | .............. B60L 58/24 |
| WO | WO-2021244832 A1 | * | 12/2021 | ........... B60H 1/3232 |

*Primary Examiner* — Drew J Brown

(74) *Attorney, Agent, or Firm* — Foley & Lardner LLP

(57) ABSTRACT

A trailer includes a storage space configured to store outdoor power equipment and a plurality of equipment battery packs, each being configured to power the outdoor power equipment, a hitch tongue, a plurality of wheels, and a plurality of receptacles each configured to receive a primary battery pack. The plurality of receptacles are electrically coupled to a wiring system configured to deliver electricity from the primary battery packs to the plurality of equipment battery packs.

19 Claims, 9 Drawing Sheets

(56) References Cited

U.S. PATENT DOCUMENTS

| | | | | |
|---|---|---|---|---|
| 2016/0107710 | A1* | 4/2016 | Hindle | B60P 3/00 307/9.1 |
| 2017/0282733 | A1* | 10/2017 | Ito | B60L 53/38 |
| 2017/0331372 | A1 | 11/2017 | Miki | |
| 2018/0102666 | A1 | 4/2018 | Margaritis et al. | |
| 2019/0082590 | A1 | 3/2019 | Velderman et al. | |
| 2019/0160972 | A1 | 5/2019 | Zeiler et al. | |
| 2019/0230850 | A1 | 8/2019 | Johnson et al. | |
| 2019/0245366 | A1* | 8/2019 | Coady | B65G 1/1373 |
| 2019/0302764 | A1* | 10/2019 | Smith | B60D 1/62 |
| 2019/0359198 | A1 | 11/2019 | Velderman et al. | |
| 2020/0001732 | A1 | 1/2020 | Nohra et al. | |
| 2020/0317057 | A1 | 10/2020 | Salter et al. | |
| 2021/0021139 | A1 | 1/2021 | Windsor | |
| 2021/0268953 | A1* | 9/2021 | Shultz | B60P 1/435 |
| 2021/0316625 | A1 | 10/2021 | Oetken et al. | |
| 2021/0408820 | A1* | 12/2021 | Koenen | B60L 1/006 |
| 2022/0305938 | A1* | 9/2022 | Healy | H02J 7/0045 |
| 2022/0324527 | A1* | 10/2022 | Mast | B62D 59/04 |
| 2025/0087812 | A1* | 3/2025 | Wang | H01M 50/244 |
| 2025/0239882 | A1* | 7/2025 | Suchoza | B60L 53/302 |

* cited by examiner

OUTDOOR POWER EQUIPMENT CHARGING TRAILER

CROSS-REFERENCE TO RELATED PATENT APPLICATIONS

This application claims the benefit of and priority to U.S. Provisional Application No. 63/395,482, filed on Aug. 5, 2022, the entire disclosure of which is hereby incorporated by reference herein.

BACKGROUND

A trailer may be used to transport various types of equipment, including outdoor power equipment, vehicles, aerial man lifts, floor care devices, golf carts, lift trucks and other industrial vehicles, recreational utility vehicles, industrial utility vehicles, lawn and garden equipment, and energy storage or battery backup systems. Outdoor power equipment includes lawn mowers, riding tractors, snow throwers, pressure washers, portable generators, tillers, log splitters, zero-turn radius mowers, walk-behind mowers, riding mowers, and turf equipment such as spreaders, sprayers, seeders, trimmers, rakes, and blowers. Outdoor power equipment may, for example, use one or more electric motors to drive an implement, such as a rotary blade of a lawn mower, a pump of a pressure washer, the auger of a snow thrower, and/or a drivetrain of the outdoor power equipment. The electric motors may be powered by rechargeable battery packs.

SUMMARY

At least one embodiment relates to a trailer that includes a storage space configured to store outdoor power equipment and a plurality of equipment battery packs, each being configured to power the outdoor power equipment, a hitch tongue, a plurality of wheels, and a plurality of receptacles each configured to receive a primary battery pack. The plurality of receptacles are electrically coupled to a wiring system configured to deliver electricity from the primary battery packs to the plurality of equipment battery packs.

Another embodiment relates to a trailer that includes a body defining a storage space configured to store outdoor power equipment and a plurality of equipment battery packs, each being configured to power the outdoor power equipment, a hitch tongue, a plurality of wheels, a primary battery pack configured to store electricity and to supply power to the plurality of equipment battery packs to charge the plurality of equipment battery packs, and a battery charge indicator visible from outside of the body. The battery charge indicator configured to indicate a charge status of the primary battery pack.

Another embodiment relates to a trailer that includes a body defining a storage space configured to store outdoor power equipment and a plurality of equipment battery packs, each being configured to power the outdoor power equipment, a hitch tongue, a plurality of wheels, a primary battery pack configured to store electricity and to supply power to the plurality of equipment battery packs to charge the plurality of equipment battery packs, a first motor coupled to and configured to drive a first wheel of the plurality of wheels, a second motor coupled to and configured to drive a second wheel of the plurality of wheels, wherein the first motor and the second motor are powered by the primary battery pack, and a controller configured to control a rotational speed of the first motor and the second motor.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

It will be recognized that the Figures are schematic representations for purposes of illustration. The Figures are provided for the purpose of illustrating one or more implementations with the explicit understanding that the Figures will not be used to limit the scope of the meaning of the claims.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Many landscapers use transportation vehicles, such as trailers, to haul power equipment to and from job sites. In some cases, the landscapers are hired to complete simple, short in-and-out jobs. Additionally, landscapers often have several jobs to complete in a single day, with short drive times between each job site. As such, the ability to rapidly charge power equipment in a short amount of time can be vastly beneficial to landscapers and other operators of power equipment. Furthermore, the capability to charge the power equipment while on-board a transportation vehicle with a built-in charging system can improve job efficiency. Job efficiency can improve by decreasing the amount of time operators waste recharging power equipment before they can start at a new job site or a new task. By being able to quickly charge a battery supply of the power equipment, landscapers can additionally eliminate the cost of needing a larger, more expensive battery packs.

Figure 1:
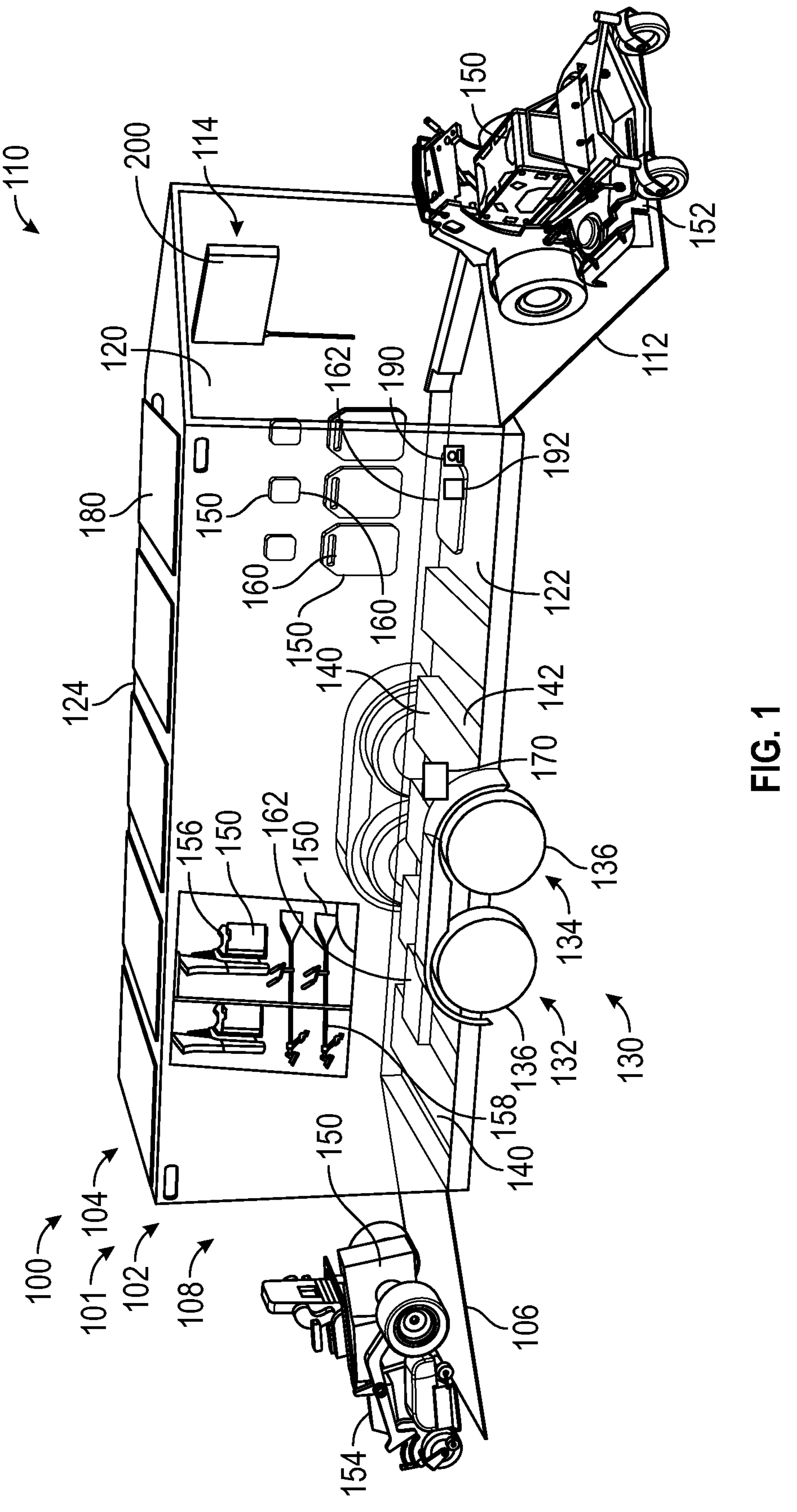
FIG. 1 is a perspective view of a charging trailer, according to some embodiments.

Referring to FIG. 1, a charging trailer 100 is shown, according to some embodiments. The charging trailer 100 includes a body 101 defining a storage space 102 configured to store a variety of outdoor power equipment. At a rear end 104 of the charging trailer 100, the charging trailer 100 includes a rear entry ramp 106 leading to a rear entryway 108. In some embodiments, the charging trailer 100 may include a front entry ramp 112 leading to a front entryway 114 at a front end 110 of the charging trailer 100. In some embodiments, the rear entry ramp 106 and/or front entry ramp 112 may include two pop-up wheel supports spaced to respectively support the left and right wheels of a ZTR mower (e.g., stand-on ZTR mower 152, sit-on ZTR mower 154, etc.) such that the underside of the ZTR mower can be accessed to remove and replace the mower blades. The charging trailer 100 may include a hitch tongue 116 (shown in FIG. 2) configured to be coupled to the vehicle (e.g., a truck, a car, a pickup truck, etc.). The storage space 102 to includes a first wall 118, a second wall 120, a floor 122, and a roof 124 (e.g., ceiling). The charging trailer 100 includes an axle assembly 130 that includes one or more axles 132, 134. The axles 132, 134 coupled to wheels 136 configured to support the charging trailer 100 and to enable the charging trailer 100 to roll. In some embodiments, the charging trailer 100 may not include a roof 124 and may instead be an open-air trailer. The charging trailer 100 may be at least 14 feet long, for example, about 18 to 20 feet long.

The charging trailer 100 includes one or more primary battery packs 140. The primary battery packs 140 may be positioned in receptacles 142 located underneath the floor 122. In some embodiments, the charging trailer may include more receptacles 142 than primary battery packs 140, allowing additional primary battery packs 140 to be added or removed as necessary depending on capacity requirements. The battery receptacles 142 may be positioned along the charging trailer 100 such that the center of gravity of the collective primary battery packs 140 is positioned equal to or in front of the center of the axle assemblies 130 as needed for improved trailer tow handling. For example, when a single primary battery pack 140 is installed in the charging trailer 100, the primary battery pack 140 may be positioned in a center receptacle 142 positioned between the first axle 132 and second axle 134. When two primary battery packs 140 are installed in the charging trailer 100, the primary battery packs 140 may be installed in the second and fourth receptacle 142 on either side of the axle assembly 130. Positioning the center of gravity of the collective primary battery packs 140 over the axle assembly 130 provides stability to the charging trailer 100 without impacting the weight imparted by the hitch tongue 116 on the trailer hitch of the vehicle. The primary battery packs 140 may be actively or passively air cooled or may be actively liquid cooled. For example, each receptacle 142 may include at least one fan to circulate air within the receptacle 142. The receptacle 142 may include one or more vents to allow air to flow into and out of the receptacle 142. In some embodiments, the receptacles 142 may not include vents and may instead be sealed to prevent water or debris from reaching the primary battery packs 140. Even when sealed, the receptacles may still include fans to circulate air to improve heat transfer out of the receptacle 142. In some embodiments, the charging trailer 100 may include five receptacles 142 each configured to receive a primary battery pack 140 with an approximately 10 kWh capacity or 12 kWh capacity.

The primary battery packs 140 supply power to charge the equipment battery packs 150 of various outdoor power equipment stored on the charging trailer 100. A controller 200 may control the flow of electricity into and out of the various batteries and charging inputs on the charging trailer 100. The primary battery packs 140 may have a higher voltage than any of the equipment battery packs 150 expected to be charged by the charging trailer 100. The outer power equipment may include, for example, stand-on ZTR mowers 152, sit-on ZTR mowers 154, leaf blowers 156, edge trimmers 158, or any other battery-powered outdoor power equipment. The equipment battery packs 150 may remain coupled to the proper power equipment, or may be removed and positioned in spare battery chargers 160. Backup equipment battery packs 150 may also be charged by the primary battery packs 140 via the spare battery chargers 160. In some embodiments, the equipment battery packs 150 may be connected to the primary battery packs 140 via a wired connection. In some embodiments, the equipment battery packs 150 may be charged by a wireless inductive charger. For example, the stand-on ZTR mower 152 and the sit-on ZTR mower 154 may be charged by the inductive chargers 162. The charging trailer 100 may include docks configured to securably couple the stand-on ZTR mower 152 and the sit-on ZTR mower 154 in predetermined positions such that the inductive chargers 162 are positioned proximate an induction coil in each of the stand-on ZTR mower 152 and the sit-on ZTR mower 154. The inductive charger 162 induce a current in the induction coil which can be used to charge the equipment battery packs of the stand-on ZTR mower 152 and the sit-on ZTR mower 154. In some embodiments, the charging trailer 100 may be used to transport and charge electric power sports equipment (e.g., go-karts, all-terrain vehicles, snowmobiles, motorcycles, e-bikes, etc.). In some embodiments, the charging trailer 100 may be used as a food truck, and the primary battery packs 140 may be used to power kitchen equipment.

In some embodiments, the charging trailer 100 may include one or more motor/generators 170 coupled to at least one of the wheels 136. The motor/generator 170 may include an alternator with a stator and a rotor configured to be rotated by the at least one wheel 136. For example, in a single axle trailer 100 with two wheels, there may be a motor/generator coupled to each wheel. The alternator is configured to generate electricity when the at least one wheel 136 turns the rotor relative to the stator. The generated electricity may be used to charge the primary battery packs 140 and/or to directly charge the equipment battery packs 150. In some embodiments, the drive motor/generator 170 may function as a regenerative braking system, converting kinetic energy from the charging trailer to electrical energy and contributing to the braking force when the charging trailer 100 and the tow vehicle are decelerating. In some embodiments, the drive motor/generator 170 may generate electricity even when the charging trailer 100 and the tow vehicle are not decelerating. For example, the motor/generator 170 may generate electricity at any time the charging trailer 100 is moving (e.g., tow charging). Though this may reduce the fuel efficiency of the tow vehicle, it may be necessary or desired to apply additional electricity to the charging trailer 100 than is available from regenerative braking alone. The motor/generator 170 may include a clutch configured to disengage the alternator when tow charging is not desired, for example, when the tow vehicle is accelerating from a stopped position and requires a large amount of torque to accelerate.

The motor/generator 170 may also draw power from the primary battery packs 140 to drive the at least one wheel 136 of the charging trailer 100, thus functioning as a motor rather than a generator. This may allow the charging trailer 100 to be more easily moved when a tow vehicle is not available or when the charging trailer must be moved to a location where there is not enough room for a tow vehicle. For example, a trailer dolly may be coupled to the hitch tongue 116 to support the front of the charging trailer 100, and motor/generator 170 may drive the wheels 136 so that the charging trailer 100 can be moved. In some embodiments, the trailer dolly may be communicatively coupled to the charging trailer 100 and may include a handle and an accelerator configured to send a signal to the charging trailer 100 to control the speed of the motor/generator 170. A user may manually steer the trailer dolly using a handle and may depress the accelerator to control the speed of the charging trailer. In this configuration, the trailer dolly may not require its own motor and may require only a small amount of electricity to power the accelerator sensor. In some embodiments, the charging trailer 100 may include multiple motor/generators 170, each coupled to a wheel 136 or may include a single motor/generator 170 including a differential such that the wheels 136 on opposite sides of the charging trailer 100 can be driven at different speeds to steer the charging trailer 100. A trailer dolly (e.g., an unpowered trailer dolly) may be coupled to the hitch tongue 116 to support the front of the charging trailer 100. The motor/generators 170 may then receive signals causing the motor/generators 170 to turn the wheels 136 to drive and steer the charging trailer 100. The signals may be received from, for example, a mobile device or an onboard control panel on the charging trailer 100. For example, a user may use an application on a tablet computer wirelessly communicatively coupled to the charging trailer 100. The user may input commands to the application by interacting with the display screen of the tablet computer. The commands may include, for example, a speed and direction. The application for a control system on the charging trailer 100 may convert the commands into motor speeds, and the control system on the charging trailer 100 may control the motor/generators 170 to operate at the determined motor speeds.

In some embodiments, the trailer may include a regenerative axle with a motor/generator 170 that drives and can be driven by both wheels coupled to the axle. This may reduce the number of motor/generators 170 required, as one motor/generator 170 may be coupled to two wheels instead of using a separate motor/generator 170 for each wheel. For example, as discussed above, a motor/generator 170 may be coupled to an axle via differential, and may both drive the wheels 136 coupled to that axle, or act as a generator using regenerative braking to generate power from the rolling wheels 136. In some embodiments, the trailer may include a rotating axle that does not include a differential, and a shaft-mounted motor/generator 170 (e.g., a torque motor, an integrated motor generator) may be coupled to the rotating shaft of the axle. The motor/generator 170 may act as a motor to turn the axle to drive each wheel coupled to the axle, and may act as a generator to generate electricity from the rotation of the axle when the trailer 100 is being towed (e.g., apply a negative torque to the wheels which is overcome by the towing force and used to generate electrical energy that is supplied to the primary battery packs 140 and/or the equipment battery packs 150), thus generating electrical power through regeneration from both wheels simultaneously. In some embodiments, a generator, rather than a motor/generator 170, may be coupled to the rotating axle. The generator may generate power through regenerative braking from each wheel 136 coupled to the axle, but may not be configured to turn the axle to drive the wheels 136.

The charging trailer 100 may include a plurality of photovoltaic panels 180 positioned on the roof 124 and/or one or both of the outer sides of the walls 118, 120. The photovoltaic panels 180 convert light (e.g., sunlight) to electricity and supply electricity to charge the primary battery packs 140 and/or to directly charge the equipment battery packs 150. Landscaping trailers are often driven and parked outside during the day. The photovoltaic panels 180 allow the primary battery packs 140 and/or the equipment battery packs 150 to be charged any time there is adequate light hitting the charging trailer 100. The walls 118, 120 or the photovoltaic panels 180 coupled to the walls 118, 120 may be angled with the bottoms projecting further out from the center of the charging trailer 100 than the top, such that the photovoltaic panels 180 receive more sunlight. In some embodiments, the charging trailer 100 may include an onboard generator 185 (e.g., an inverter generator) including an internal combustion engine and an alternator. The internal combustion engine may burn fuel (e.g., propane, gasoline, etc.) to turn a rotor of the alternator such that the alternator generates electricity that can be used to charge the primary battery packs 140 and/or to directly charge the equipment battery packs 150. The generator 185 may include a rectifier to convert alternating current to direct current, and may include an inverter to convert the direct current to a "clean" alternating current.

The charging trailer 100 may include one or more input charging ports 190 configured to receive a charging plug. The charging plug may be connected to grid power or any other power source and can be plugged into the input charging port 190 to charge the primary battery packs 140 and/or to directly charge the equipment battery packs 150 when the charging trailer 100 is in the vicinity of the charging plug. For example, the charging plug may be connected to the input charging port 190 overnight on the charging trailer 100 is not being used on worksites. In some embodiments, the input charging port 190 may be configured to receive a Type 1 SAE J1772 Combined Charging System plug or other automotive standard EV charging connector types to enable fast (Level 1, Level 2, or Level 3) charging of the battery packs 140, 150. In some embodiments, the input charging port 190 may be configured to receive a 110/120 V AC single phase NEMA 5-15 or 5-20 plug to allow a user to plug in the charging trailer 100 to a common household outlet with an extension cord. In some embodiments, the input charging port 190 may be configured to receive a 30 amp 110/120 V plug, a 208/240 V single phase NEMA 14-50 plug (80 amp, Level 2 charging), or 208/240 V single phase NEMA 6-50 plug (80 amp, Level 2 charging). In some embodiments, the charging trailer 100 may include multiple input charging ports 190 of various types. The input charging ports 190 may be positioned on an external wall of the charging trailer 100 (e.g., walls 118, 120) for easy access from outside the charging trailer 100. The charging trailer 100 may include in rectifier that converts the alternating current power input via the input charging port 190 to direct current power that can be used to charge the battery packs 140, 150.

The charging trailer 100 may include one or more output power ports 192 configured to supply power from the primary battery packs 140 to external devices located outside the charging trailer 100. For example, a power tool with a wired power connector and no battery may be plugged into the output power port 192, which may supply power to the power tool. As another example, a battery charger may be plugged in the output power port 192 to charge a device when there are no charging spaces available in the charging trailer 100 or when it is more convenient to charge a device outside the charging trailer 100. The output power port 192 may be, for example, a 110/120 V AC single phase NEMA 5-15 or 5-20 plug (20 amp, Level 1 charging), a 208/240 V AC single phase NEMA 14-50 plug (80 amp, Level 2 charging), or a 208/240 V AC single phase NEMA 6-50 plug (80 amp, Level 2 charging).

Figure 2:
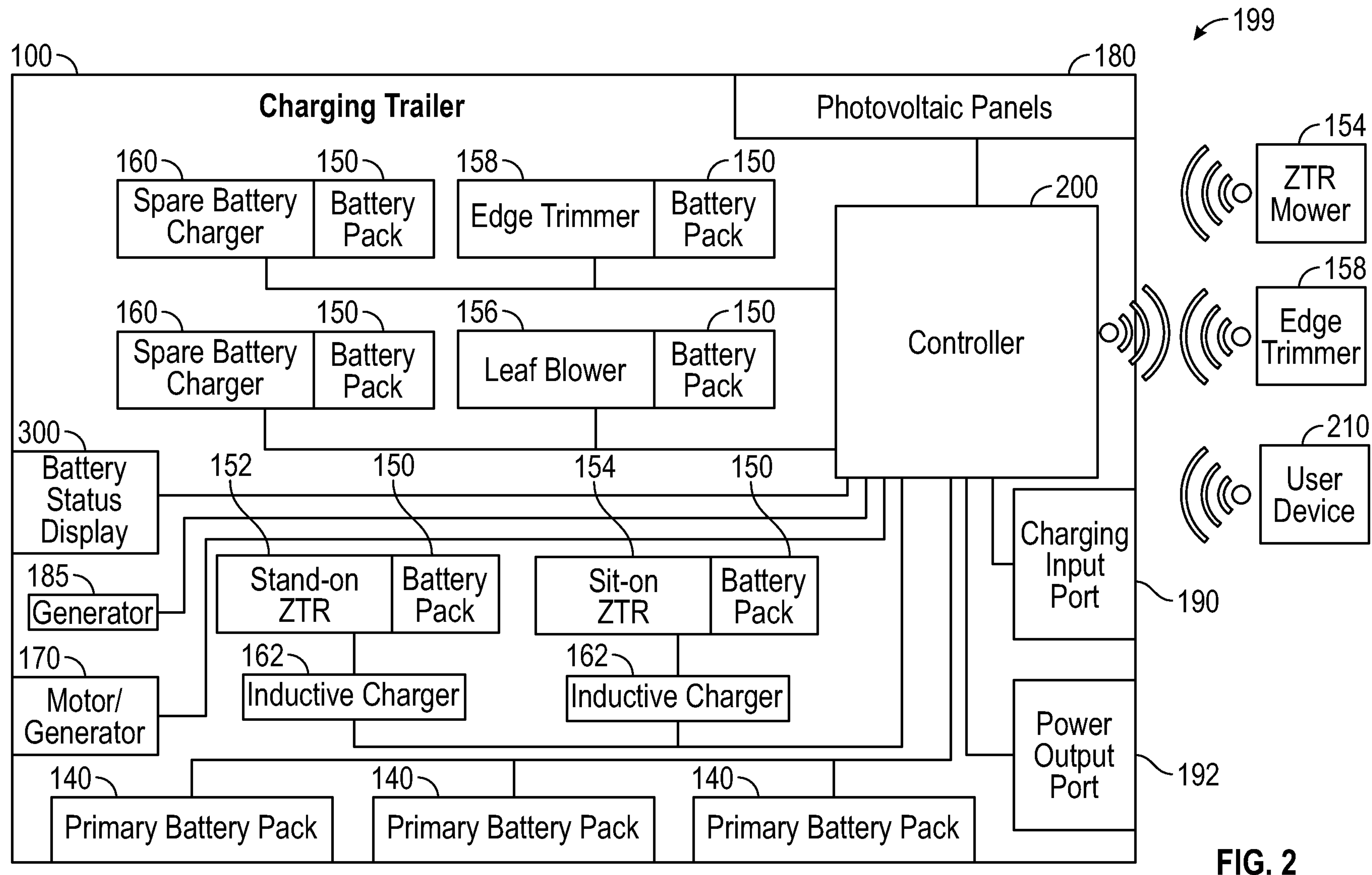
FIG. 2 is a schematic diagram of a charging and control system for outdoor power equipment is shown, according to some embodiments.

Referring now to FIG. 2, a schematic diagram of a charging and control system 199 for outdoor power equipment is shown, according to some embodiments. In some embodiments, a controller 200 controls the flow of electricity in the charging trailer 100. The controller 200 is electrically and/or communicatively coupled to the various components of the system 199. The controller 200 may receive power from various sources, such as the input charging port 190, the photovoltaic panels 180, the motor/generator 170, and the primary battery packs 140. The controller 200 may also distribute power to the various components, such as the equipment battery packs, the primary battery packs, 140, the inductive chargers 162, the battery status display 300 (described below with regard to FIG. 3), the spare battery chargers 160, the output power port 192, the motor/generator 170 etc. In some embodiments, the equipment batteries may receive power form the controller via the various outdoor power equipment (e.g., the ZTRs 152, 154, the edge trimmers 158, the leaf blowers 156). For example, a ZTR 152 may include a plug that can be connected to the controller 200 and allows the power to flow to the battery pack of the ZTR. In some embodiments, power may be delivered between components without the being directed through the controller 200. For example, the primary battery packs 140 may be configured to always supply power directly to the inductive chargers 162 such that power from the is supplied to a ZTR 152, 154 whenever the ZTR 152, 154 is positioned above the inductive charger 162. A control module within the ZTR 152, 154 may disengage the induction coil when the equipment battery pack 150 is fully charged without any intervention form the controller 200. A user may also control the charging of the ZTR 152, 154 via a user interface on the ZTR 152, 154 or using the user device 210 (e.g., a smartphone, a personal computer, a tablet computer, etc.) directly connected to the control module of the ZTR 152, 154.

The controller 200 may also receive information from and send information to a control module embedded in each component of the system 199 that includes a communication module (e.g., an Internet-of-Things or IoT module) configured to communicate wirelessly with other devices. For example, the controller 200 may communicate with a control module of the primary battery packs 140 to receive information about the primary battery packs, for example, battery charge level, battery discharge rate, battery temperature, etc. In some embodiments, the control module may be a component of the outdoor power equipment rather than the battery. For example, a control module of a leaf blower 156 may communicate with the controller 200 to deliver information regarding the equipment battery pack 150 coupled to the leaf blower 156. The controller 200 may also communicate with and control other components of the system 199 as well. For example, the controller 200 can control the motor/generator 170 to switch between generator mode and motor mode, or to disengage a clutch to deactivate the generator. The controller 200 may communicate with the various components via a wired or wireless connection. The system 199 may use the Controller Area Network (CAN) bus protocol using SAE J1939 communication standards. The controller may alternatively or additionally communicate via various local wireless protocols such as Bluetooth or Wi-Fi. When a wireless communication protocol is used, the controller 200 may continue to communicate with the outdoor power equipment or equipment battery packs 150 when they are being used in the field. For example, the controller 200 can continue to monitor the status of the equipment battery packs 150 coupled to a ZTR mower 154 and an edge trimmer 158 as they are being used on a landscaping customer's lawn via Bluetooth. Using a wireless communication protocol, the controller 200 can also connect to a user device 210 to relay information regarding the battery packs 140, 150 and to receive commands from a user. In some embodiments, the controller 200 and other system 199 components may be cellular enabled and may communicate via a cellular network, enabling a remote user to send commands to the controller 200 using a user device 210. A remote user may track the location of the charging trailer via the user device 210.

In some embodiments, all of the charging inputs (e.g., the input charging port 190, the photovoltaic panels 180, the motor/generator 170) first charge the primary battery packs 140, and the primary battery packs 140 in turn charge the equipment battery packs 150 and power the other components (e.g., the inductive chargers 162, the battery status display 300, the output power port 192, etc.). In other embodiments, the various components may simultaneously receive power from the charging inputs. For example, when the input charging port 190 is connected to grid power, power may be delivered to the primary battery packs 140, the equipment battery packs 150, the battery status display 300, the inductive chargers 162, and the output power port 192 simultaneously. In some embodiments, the charging trailer may have multiple input charging ports 190. For example, a first input charging port 190 may be a high voltage Level 3 Charging port and a second input charging port 190 may be a lower voltage charging port. The high voltage input charging port 190 can be used to charge the primary battery packs 140 while the lower voltage input charging port 190 simultaneously charges the equipment battery packs 150. In some embodiments, both input charging ports 190 may be used to charge the primary battery packs 140 even more rapidly than with the high voltage input charging port 190 alone. For example, a user may make a selection on a user interface of the charging trailer 100, or via a user device 210 that is communicatively coupled to the charging trailer 100, as to whether the lower voltage input charging port 190 should charge the equipment battery packs 150 or supply additional power to the primary battery packs 140, or so supply a portion of the power to each.

In some embodiments, the controller 200 may support bidirectional charging. The equipment battery packs 150 connected to the spare battery chargers 160, for example, may both receive power from the primary battery packs 140 and supply power to the primary battery packs 140. As an example of the foregoing, the primary battery packs 140 may be fully depleted and a user may wish to operate the motor/generator 170 in motor mode to move the charging trailer 100 into a storage location. If no external power is available (e.g., from the photovoltaic panels 180 or the input charging port 190), the controller 200 may direct power from the equipment battery packs 150 to the primary battery packs 140. Once the primary battery packs 140 are sufficiently charged, the primary battery packs 140 may supply power to the motor/generator 170 to move the charging trailer 100. Then, during normal operation of the charging trailer 100, the primary battery packs 140 can be used to charge the equipment battery packs 150. The controller 200 may include a DC to DC buck-boost voltage conversion module that can convert the relatively low DC voltage supplied by the equipment battery packs 150 to the higher DC voltage required to charge the primary battery packs 160. Similarly the buck-boost voltage conversion module can convert the high voltage supplied by the primary battery packs 160 to the lower voltage required to charge the equipment battery packs 150.

The controller 200 may prioritize charging equipment battery packs 150 over the primary battery packs 140, or vice versa, either automatically (e.g., based on programmed software) or based on user input. In some embodiments, the controller 200 may prioritize charging the equipment battery packs 150, and may only charge the primary batteries 140 when the equipment battery packs 150 are full or when there is excess power being supplied. For example, when the charging trailer 100 is on a job site, the only power input into the charging trailer 100 may be from the photovoltaic panels 180. The power supplied may be first used to charge the equipment battery packs 150. If power is generated by the photovoltaic panels 180 at a higher rate than can be supplied to the equipment battery packs 150, the excess power can be supplied to the primary battery packs 140. Additionally, if all of the equipment battery packs 150 are fully charged, the power generated by the photovoltaic panels 180 can be supplied to the primary battery packs 140.

The controller 200 may be configured to prioritize certain battery packs 140, 150 to charge (e.g., to charge a battery pack of a certain type of equipment before charging a battery pack of another type of equipment). For example, a landscaping crew may store two electric ZTRs 152, 154, two electric edge trimmers 158 and one gas-powered edge trimmer in the charging trailer 100 before leaving for a day of work. The controller 200 may be configured to prioritize charging the ZTRs 152, 154 over the electric edge trimmers 158 because the work crew is able use the gas-powered edge trimmer if the equipment battery packs 150 of the electric edge trimmers 158 run out of charge. If the ZTR battery packs 150 ran out of charge, the work crew would have to wait while the primary battery packs 140 or the photovoltaic panels 180 recharge ZTR battery packs 150 and would be unable to mow a lawn. A user may control the priority list directly using a user interface of the charging trailer 100, or via a user device 210 that is communicatively coupled to the charging trailer 100. In some embodiments, the controller 200 may automatically determine the charging priority based on the available equipment. For example, the user may input a list of equipment that is available on the trailer at the beginning of the day. Using the example above, the user may input that the charging trailer includes two electric ZTRs 152, 154, two electric edge trimmers 158, and one gas-powered edge trimmer. The controller may automatically determine that the ZTR battery packs 150 should be charged before the edge trimmer battery packs 150 are charged for the reasons discussed above.

In some embodiments, the controller 200 may prioritize charging the battery packs 150 with the lowest charge. For example, if a ZTR battery pack 150 is 50 percent charged and a leaf blower battery pack 150 is 40 percent charged. The controller may prioritize charging of the leaf blower battery pack 150. In some embodiments, the controller may prioritize charging a certain type of battery pack 150, such as when a certain type of battery pack 150 has less charge than other type. Because the charging trailer 100 may be communicatively coupled to equipment in use outside the charging trailer 100 (e.g., via an IoT module), the controller 200 can adjust the priorities based on information from the in-use devices. For example, a leaf blower 156 and an edge trimmer 158 may be in use on a job site. The controller 200 may receive battery charge data via the embedded IoT modules in the equipment 156, 158. If the battery pack 150 of the leaf blower 156 has a 20 percent charge, and the battery pack 150 of the edge trimmer 158 has a 60 percent charge, the controller 200 may prioritize charging a spare leaf blower battery pack 150 via a spare battery charger 160 over charging a spare edge trimmer battery pack 150. The controller may further take into account the rate of discharge of the battery packs 150. For example, if the battery pack 150 of the leaf blower 156 has a 20 percent charge and is discharging at 1 percent per minute, and the battery pack 150 of the edge trimmer 158 has a 60 percent charge and is discharging at 4 percent per minute, the controller 200 may prioritize charging a spare edge trimmer battery pack 150 via a spare battery charger 160 over charging a spare leaf blower battery pack 150, even though the battery pack 150 of the leaf blower 156 has a lower charge. The controller 200 may also take into account the number of each type of equipment being used. For example, if three leaf blowers 156 and one edge trimmer 158 are being used, the controller may prioritize charging a spare leaf blower battery 105, as there is likely more leaf blowing to be done on the job site than edge trimming.

In some embodiments, the controller 200 may be configured to prioritize certain battery packs 150 when those battery packs 150 fall below a predetermined charge threshold. For example, the controller 200 may prioritize charging a spare ZTR battery pack 150 via a spare battery charger 160 such that there is enough charge in the spare battery pack 150 for a ZTR 152, 154 to mow a lawn at the next job site. Once the charge threshold is met, the priority list can change so that charging battery packs 150 for other types of equipment is prioritized over charging the spare ZTR battery pack 150. In some embodiments, the controller 200 may stop the primary battery packs 140 from supplying power to certain equipment when the charge of the primary battery packs 140 fall below a predetermined charge threshold, so that capacity is saved for higher priority battery packs 150. For example, when the ZTRs 152, 154 are in use and the ZTR battery packs 150 fall below a predetermined charge threshold, the controller 200 may stop the primary battery packs 140 from charging spare leaf blower battery packs 150 and from supplying power to the battery status display 300 when the primary battery packs fall below 25% charge. This may allow the primary battery packs 140 to have enough charge remaining to recharge the ZTR battery packs 150 on the way to the next jobsite.

The controller 200 may also prioritize certain power sources. For example, the controller 200 may always allow power to be supplied by the photovoltaic panels 180. The controller 200 may only operate the motor/generator 170 in generator mode when the photovoltaic panels 180 do not supply enough power. The controller may only activate the generator 185 when no other power sources are available and the primary battery packs 140 fall below a predetermined charge threshold. The controller may not activate the generator 185 during certain times of day, such as the early morning and the evening, to avoid producing excess noise.

Figure 3:
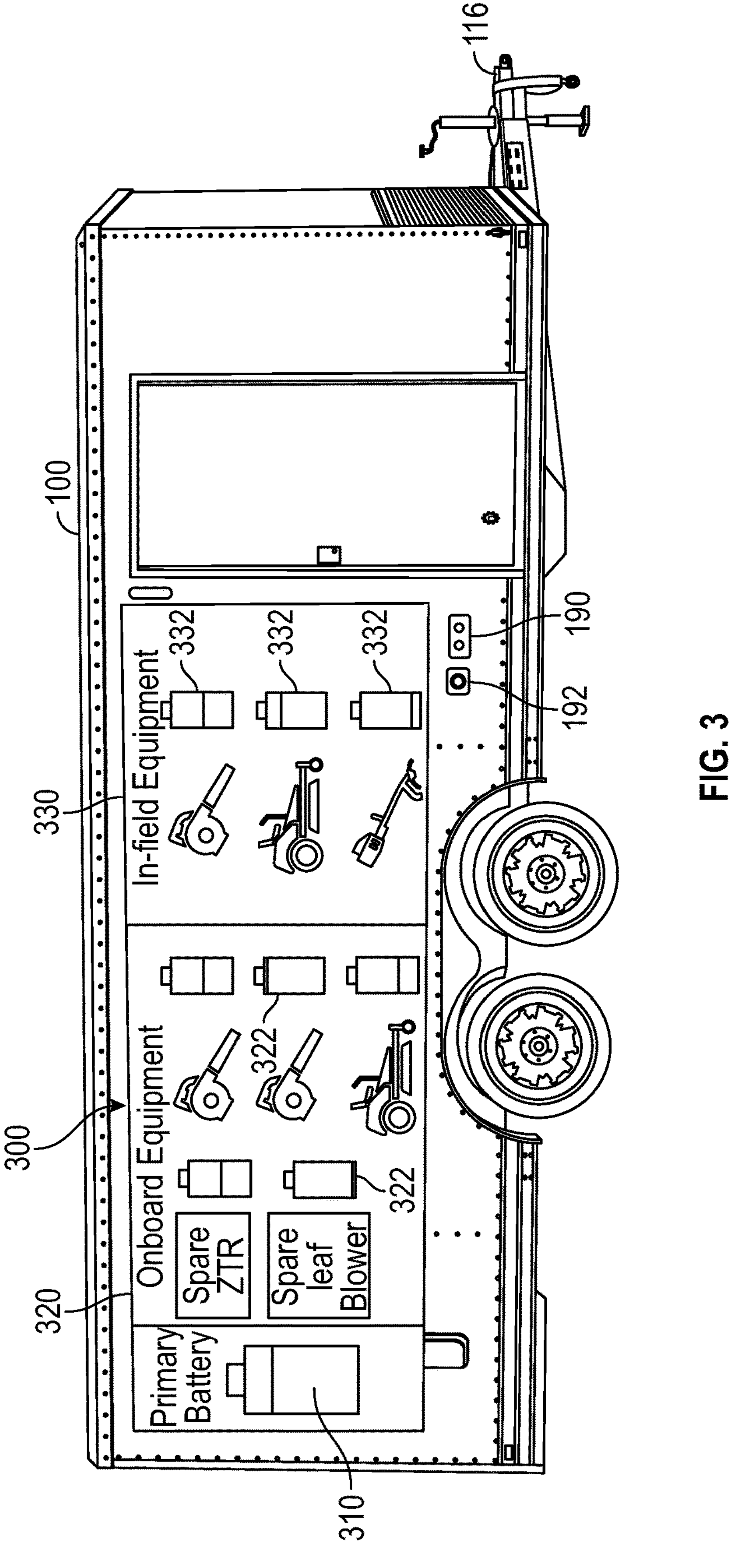
FIG. 3 is a perspective view of the charging trailer of FIG. 1 with a battery status display visible from outside the trailer, according to some embodiments.

Referring now to FIG. 3, the charging trailer 100 is shown with a battery status display 300 (e.g., a battery charge indicator), according to some embodiments. The battery status display 300 is configured to indicate the battery status of at least the primary battery packs 140 to users outside the charging trailer 100. In some embodiments, the display 300 may be a digital screen configured to display various graphical user interfaces generated by the controller 200. In some embodiments, the display 300 may be a touchscreen configured to receive user inputs. For example, a user may input the types and quantity of the equipment onboard the trailer or may configure the charging priority of the equipment. In some embodiments, the display 300 may be a simple light or an array of lights configured to display the status of the primary battery packs 140 by changing color or brightness. For example, a light may be red when the primary battery packs 140 are below 25 percent charged, yellow when the primary battery packs 140 are between 25 and 75 percent charged, and green when the primary battery packs 140 are above 75 percent charged. The light may flash when the primary battery packs 140 are currently being charged. As another example, the battery status display 300 may include four lights, with one illuminated light indicating 25 percent charge, two illuminated lights indicating 50 percent charge, etc.

In some embodiments, the battery status display 300 may be able to show information about each battery and/or piece of equipment that is communicatively coupled to the controller 200. For example, the display 300 in FIG. 3 includes a primary battery status indicator 310, an onboard equipment display area 320 with battery status indicators 322 for each piece of equipment onboard the charging trailer 100, and an in-field equipment display area 330 with battery status indicators 332 for each piece of equipment currently in use outside the charging trailer 100. The equipment may be identified by name or with a symbol, and the display 300 may show additional information about the equipment (e.g., time in use, model number, battery pack discharge rate, equipment age, etc.). A user may refer to the battery status indicators 310, 322, 332 to reconfigure the charging priority of the trailer or to decide which equipment to use. For example, if a leaf blower 156 is 10 percent charged and an edge trimmer 158 is 50 percent charged, the user may refer to the display 300 and choose to use the edge trimmer 158 first and then use the leaf blower 156 when the edge trimming is completed.

Figure 4:
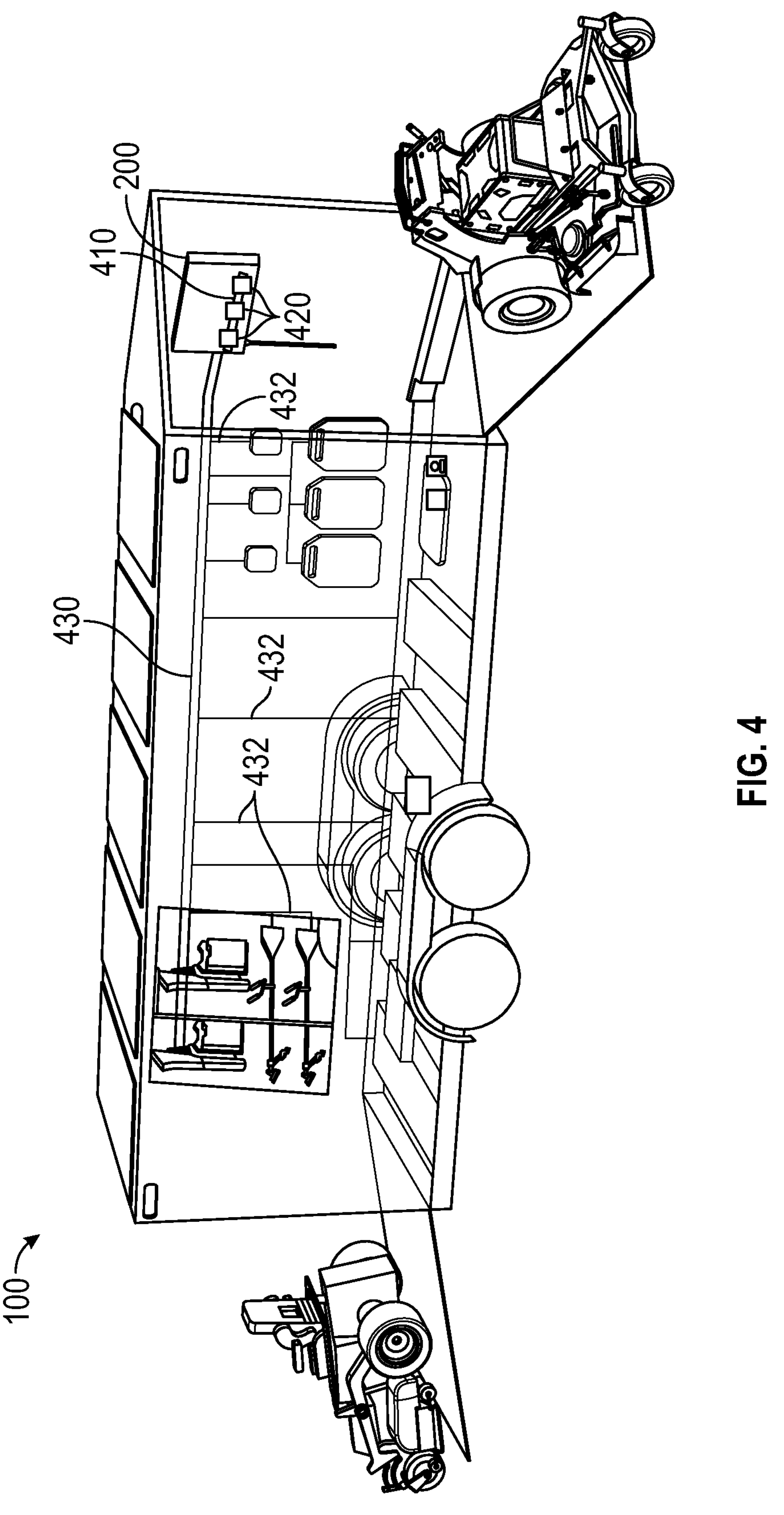
FIG. 4 is a perspective view of the charging trailer of FIG. 1 including additional electrical features.

Referring now to FIG. 4, the charging trailer 100 is shown including additional features of the electrical system, according to some embodiments. The controller 200 includes a power rail 410 to which breaker modules 420 may be attached. The breaker modules 420 are configured to covert the electrical current supplied by the primary battery packs 140 or other power sources to the appropriate current type and voltage for each connected equipment battery pack 150. In some embodiments, the voltage of the primary battery packs 140 is greater than or equal to 1.5 times the highest voltage required by the equipment battery packs 150 to provide efficient voltage drop energy transfer. For example, the primary battery packs 140 may output a 450 V direct current. The equipment battery packs 150 for the ZTRs 152, 154 may be charged by a 56V direct current. A first breaker module 420 may be electrically coupled to the power rail 410 and may include a voltage converter configured to reduce the 450 V current from the power rail 410 to a 56 V current for charging the ZTRs 152, 154. The first breaker module 420 may then be wired to the spare battery charger 160 for ZTR battery packs 150 or to the inductive chargers 162. As another example, an edge trimmer spare battery charger 160 may be configured to plug into a 120 V alternating current outlet. A second breaker module 420 may be coupled to the power rail 410 and may include an inverter configured to convert the 450 V direct current from the power rail 410 to alternating current. The second breaker module 420 may then be wired to the edge trimmer spare battery charger 160. Additional breaker modules 420 may convert the current from the power rail 410 to other voltages, currents, and output plugs, for example, to 120V AC power for a NEMA 5-20 plug, to 120V AC power for a universal module for connecting multiple NEMA 5-20 plugs, to 240V AC power for a NEMA 14-50 plug, or to 240V AC power for a NEMA 6-50 plug, or to various DC voltages. The rail voltage may be higher than any of the voltages output by the breaker modules 420. The breaker modules 420 may have a resettable breaker switch that trips when an electrical fault is detected, similar to a home circuit breaker. The breaker modules 420 are may be configured to be easily coupled to and decoupled from the power rail 410. For example, the breaker modules 420 may be installable and removable without the use of tools by, for example, simply plugging the breaker modules 420 into a receptacle in the controller 200. Thus, the charging trailer 100 is easily customizable based on the types and quantity of equipment that is needed.

The various equipment and charging ports may be wired to the controller 200 via a main conduit 430. The main conduit 430 may be positioned along one of the walls 118, 120 or along the roof 124 rather than near or below the floor 122 to avoid water damage. Individual components may be wired to the main conduit 430 via a wire 432 that runs up the wall 118, 120.

Figure 5:
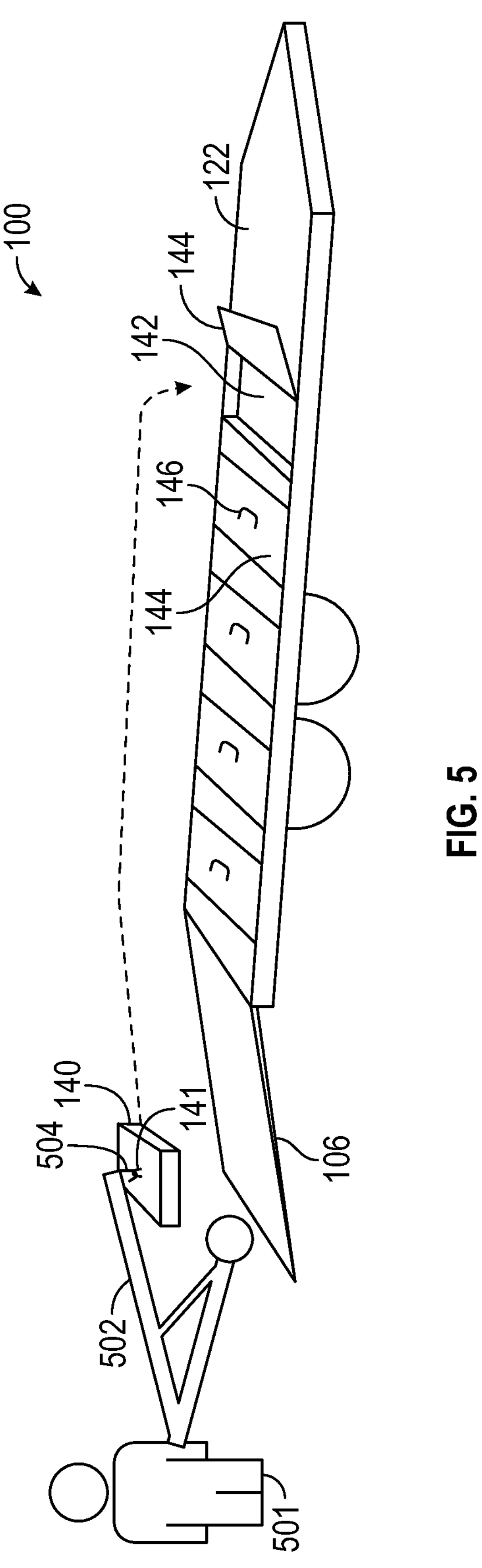
FIG. 5 is a perspective view illustrating loading a primary battery pack into the charging trailer of FIG. 1.

The primary battery packs 140 may be too heavy to lift and install into the receptacles 142 by hand. Further, the floor 122 of the storage space 102 is preferably flat so that ZTRs 152, 154 and other equipment can easily roll across the floor 122. FIG. 5 illustrates a receptacle 142 configuration and a method of installing the primary battery packs 140 in the charging trailer 100, according to some embodiments. The walls 118, 120, roof 124, and other components of the charging trailer 100 are not shown for clarity. The receptacles 142 may each include an access panel 144 with a handle 145. The handle 146 may sit within a recess in the access panel such that the handle 145 is flush with the floor when the access panel 144 is closed. To install the primary battery pack 140, a user 501 can lift the handle 146 to lift the access panel 144. The access panel 144 may be hingedly coupled to the floor 122, or may be removable from the receptacle 142. Once the access panel 144 has been lifted and the receptacle 142 opened. The user 501 may use a crane hand truck 502 with a hook 504 to lift the primary battery pack 140. The primary battery pack 140 may include an attachment point 141 (e.g., an eyelet) to connect the hook 504 to. The user 501 may then push the crane hand truck 502 up the ramp 106 and across the floor 122 to the receptacle 142. The user 501 may then lower the primary battery pack 140 into the receptacle and lower or reattach the access panel 144. To remove the primary battery pack 140 from the receptacle 142, the process is reversed.

Figure 6:
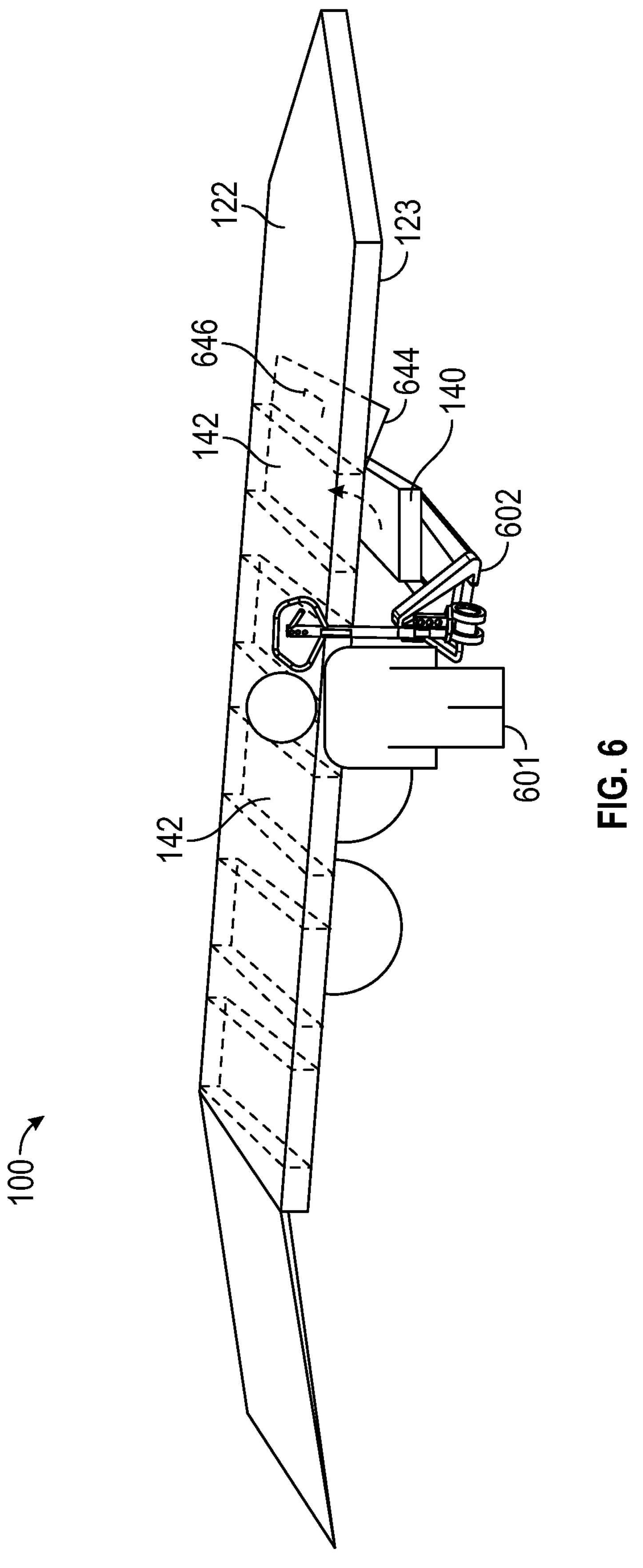
FIG. 6 is a perspective view illustrating loading a primary battery pack into the charging trailer of FIG. 1.

FIG. 6 illustrates another receptacle 142 configuration and a method of installing the primary battery packs 140 in the charging trailer 100, according to some embodiments. The walls 118, 120, roof 124, and other components of the charging trailer 100 are not shown for clarity. The receptacles 142 may each include an access panel 644 positioned on the underside 123 of the charging trailer 100. The access panel 644 may include a release mechanism 646 and may be hingedly or removably coupled to the receptacle 142. When the access panel 644 is hingedly coupled to the receptacle 142, the release mechanism may also act as an attach point for a hook positioned on the underside 123 of the charging trailer, which holds the access panel 644 in an open position. To install the primary battery pack 140, a user 601 opens the access panel 644 using the release mechanism 646 the handle to lift the access panel 144. The user 601 can then roll the primary battery pack 140 under the charging trailer 100 using, for example, a pallet jack 602. The user 601 can then jack the primary battery pack 140 upward into the receptacle 142. The receptacle 142 may include mounting features that automatically fasten the primary battery pack 140 in place once it is inserted. Alternatively or additionally, the user 601 may install one or more retaining pins from the side of the receptacle 142 or may use fasteners to couple the primary battery pack 140 to the receptacle 142 from below. The user 601 may then close or reattach the access panel 644. To remove the primary battery pack 140, the access panel 644 can be opened, the pallet jack 602 can be jacked up until it contacts the primary battery pack 140, the mounting features, pins, and/or fasteners can be removed, and the primary battery pack 140 can be lowered using the pallet jack 602

Figure 7:
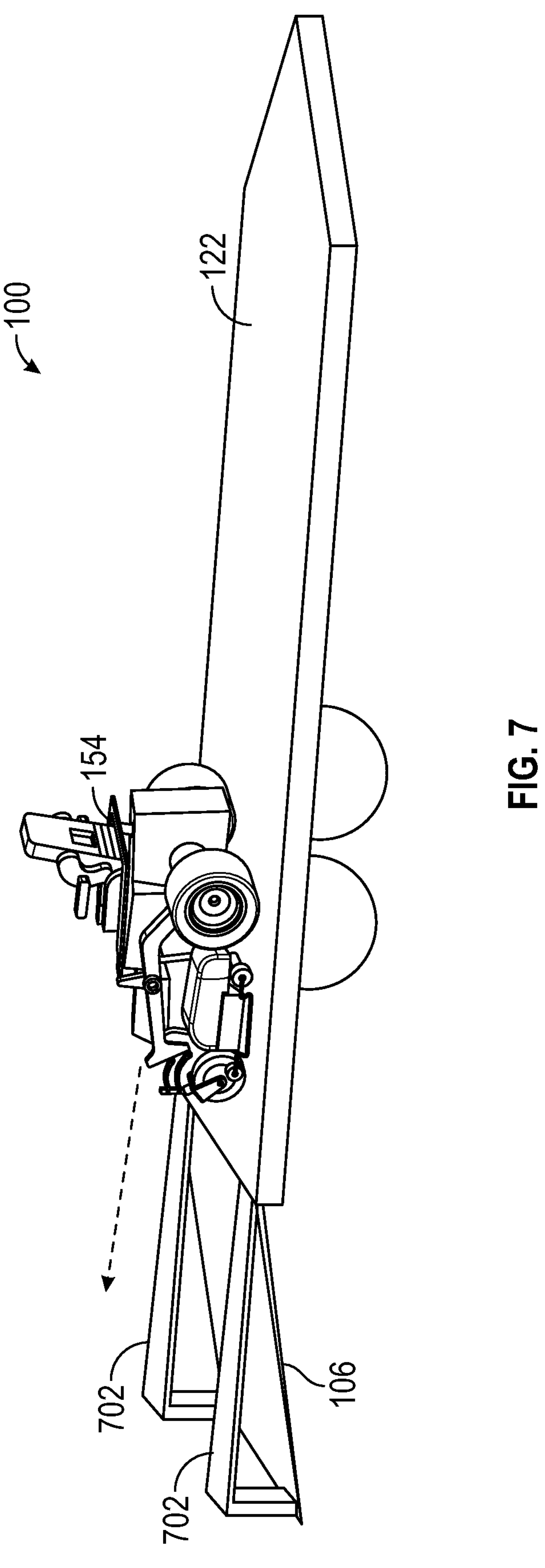
FIG. 7 is a perspective view of the charging trailer of FIG. 1 with two wheel supports for replacing ZTR mower blades.

Referring now to FIG. 7, the charging trailer 100 is shown with two wheel supports 702, according to some embodiments. The walls 118, 120, roof 124, and other components of the charging trailer 100 are not shown for clarity. The wheel supports 702 may be spaced apart to support the wheels 153 of a ZTR mower (e.g., stand-on ZTR mower 152, sit-on ZTR mower 154, etc.). In some embodiments, the wheel supports 702 may pop out or fold out form the ramp 106. In some embodiments, the wheel supports 702 may be pulled out from between the floor 122 and the underside 123 of the charging trailer 100. The ZTR (e.g., ZTR 154 as shown) may be driven out from the storage space 102 onto the wheel supports 702 so that the underside of the ZTR 152 can be accessed, for example, to change the mower blades. The wheel supports 702 may have protective rails on their outside edges and/or end barriers at the end to stop the ZTR 152 from falling off the edges or ends of the wheel supports 702.

Figure 8A:
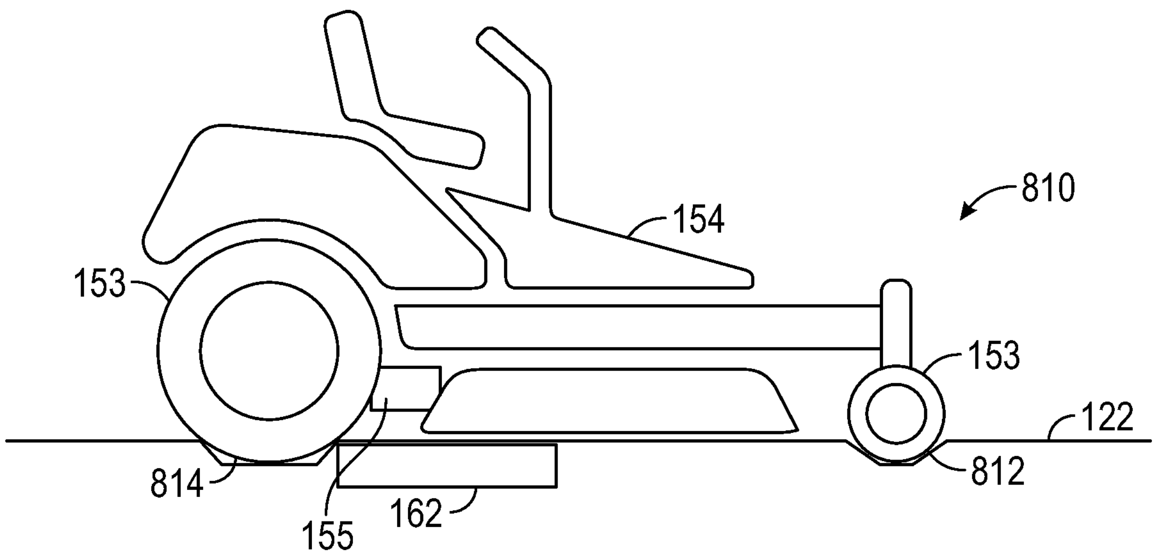
FIGS. 8A and 8B are side views of charging docks for ZTR mowers, according to some embodiments.
Figure 8B:
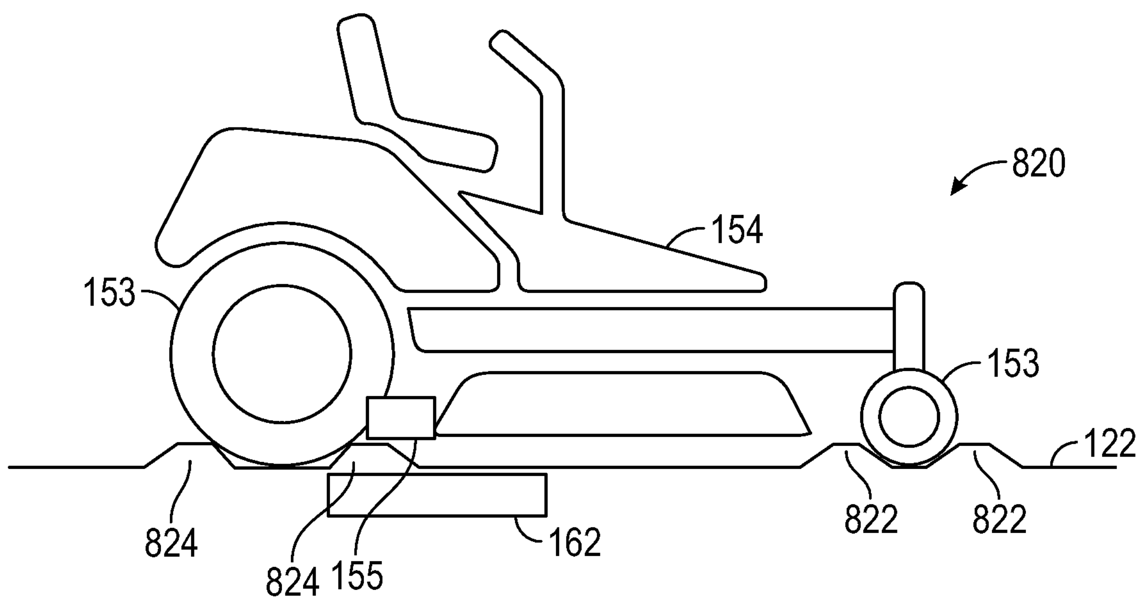
Figure 9:
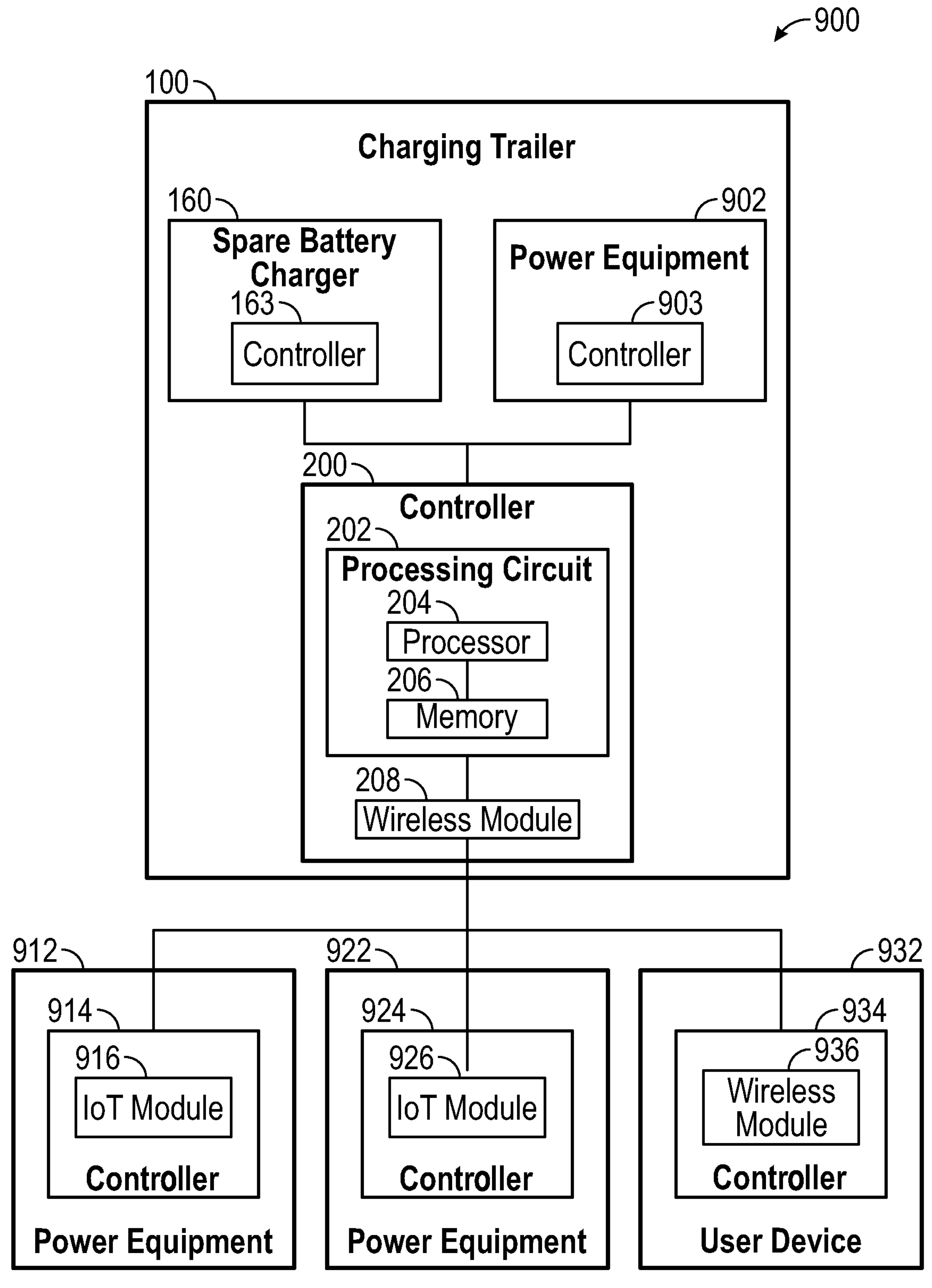
FIG. 9 is a schematic diagram of a charging and control system for outdoor power equipment, according to some embodiments.

Referring now to FIGS. 8A and 8B, inductive charging docking stations 810, 820 for a ZTR (e.g., ZTR 154 as shown) are shown, according to some embodiments. The ZTR 154 is shown in FIGS. 8A and 8B on the floor 122 of the charging trailer 100. An inductive charger 162 is positioned under the floor 122. In some embodiments, the inductive charger 162 may be partially or completely above the floor 122, and the wheels 153 of the ZTR 154 may straddle the inductive charger 162 when the ZTR is moved into the storage space 102. The docking station 810 may include with a front indentation 812 for the front wheels 153 and/or a rear indentation 814 for the rear wheels 153. In some embodiments, there may be a separate front indentation 812 for each front wheel 153 and/or a separate rear indentation 814 for the rear wheels 153. The inductive charger 162 is positioned such that when the wheels 153 are positioned in the appropriate indentations 812, 814, the induction coil 155 of the ZTR 145 is positioned above the inductive charger 162 and a current can be induced in the induction coil 155 by the inductive charger 162 to charge the battery pack 150 of the ZTR 154. The indentations 812, 814 may be deep enough that no additional straps or retaining features are required to hold the ZTR 154 in place when the charging trailer 100 is moving. A user may drive the ZTR 154 into the docking station 810 until the wheels 153 are in the indentations 812, 814 and no further action must be taken to confirm that the ZTR 154 is in the right position to be charged. Docking station 820 functions similarly to docking station 810. However, instead of indentations 812, 814, the docking station 820 includes a set of front projections 822 and/or a set of rear projections 824. The ZTR 154 may be in position for inductive charging when the front wheels 153 are between the front projections 822 and/or the rear wheels 153 are between the rear projections 824. As with the indentations 812, 814 of docking station 810, each wheel may have its own set of projections 822, 824.

Referring to FIG. 1, a schematic diagram of a charging and control system 900 is shown, according to some embodiments. The system 900 may be substantially similar to the charging and control system 199. The system 900 includes a the charging trailer 100, outdoor power equipment 902 onboard the trailer, spare battery chargers 160 onboard the charging trailer 100, outdoor power equipment 912, 922 outside the charging trailer 100, and a user device 932. The controller 200 of the charging trailer 100 is configured to communicate with controllers 163, 903 of the outdoor power equipment 902 onboard the trailer and the spare battery chargers 160, e.g., via a wired connection. The controller 200 is configured to wirelessly communicate, via the wireless module 208, with the controllers 914, 924, 934 of the outdoor power equipment 912, 922 outside the charging trailer 100 and the user device 932 via the IoT modules 916, 926 and the wireless module 936. In some embodiments, the wireless modules 208, 936 and IoT modules 916, 926 may connect via an external network. In some embodiments, the network is a Wi-Fi network, a Bluetooth network, a cellular network, etc. In some embodiments, the network also includes near-field communications (NFC), Ethernet communications, or a combination of several means of communications. The network may be a cloud-based network that includes an internet of things (IoT) system.

In some embodiments, the controller 200 is integrated with the charging trailer to monitor and control the charging and control system 900. The controller 200 includes a processing circuit 202. The processing circuit 202 includes a processor 204 and a memory 206. The processor 204 may be a general purpose or specific purpose processor, an application specific integrated circuit (ASIC), one or more field-programmable gate arrays (FPGAs), a group of processing components (e.g., parallel processing units), a neural network processing system, or other applicable processing circuits. The processor 204 can be configured to execute computer code or instructions stored in the memory 205 or received from other computer readable media, such as physical media (e.g., CD-ROM, DVD-ROM, flash drive, etc.). The memory 206 may include one or more devices (e.g. memory units, memory devices, storage devices, etc.) for storing data and/or computer code for completing and/or facilitating the functions and processes described in the present disclosure. The memory 206 may include random access memory (RAM), read-only memory (ROM) hard drive storage (physical or solid state), temporary storage, non-volatile memory, flash memory, optical memory, or any other suitable memory component for storing software objects and/or computer instructions. The memory 206 may include database components, object code components, script components, or any other type of information structure for supporting the various functions and information structures described in the present disclosure. The memory 206 may be communicably connected to the processor 204 via the processing circuit 202 and may include computer code for executing (e.g. by the processor 204) one or more of the processes described herein.

As discussed above, in some embodiments, the primary battery packs 140 may output DC power that is delivered to the controller 200. The controller 200 may then distribute the DC power to the equipment battery packs 150. In some embodiments, a breaker module 420 with an inverter may be included to convert the DC power from the controller 200 to AC power, which may then be supplied to equipment battery chargers (e.g., spare battery chargers 160) that are configured to receive AC power. For example, commercially available chargers often are configured to be plugged into a standard 120V AC wall socket. These chargers may be plugged into the breaker module 420, which has converted the DC power from the primary battery packs 140 to AC power. In other embodiments, the primary battery packs 150 or the controller may include circuitry (e.g., inverters) to convert the DC power output from the batteries of the primary battery packs 160 to AC power. For example, in some embodiments, each primary battery pack 160 may include an inverter such that the primary battery packs 160 output AC power to the controller 200. In some embodiments, the controller 200 may include an inverter, and the primary battery packs 160 may output DC power that is converted to AC power by the controller 200. In either case, the power rail 410 may be configured to output AC power, rather than DC power. This may allow for commercially available battery chargers requiring AC power to more easily be plugged into the power rail 410. For example, the power rail 410 may include several standard wall outlets, similar to a power strip, which the battery chargers can be plugged into. If breaker modules 420 are used, the breaker modules 420 would not require inverters for AC chargers because the power rail 410 outputs AC power. If DC power is required to charge an equipment battery pack 150, a breaker module 420 that includes a rectifier configured to convert AC power to DC power may be plugged into the power rail 410. The charger for the equipment battery pack 150 may then be plugged into the breaker modules 420. In some embodiments, a user may use a user device to wirelessly communicate with the controller 200 to activate and deactivate various AC circuits. For example, the user may prioritize certain loads over other loads that are more likely to be used for upcoming jobs. The controller 200 may also be configured to determine load priorities and selectively decouple certain loads. The controller 200 may prioritize charging high power demand loads, such as ZTR battery packs 150 over lower demand loads, such as edge trimmer battery packs. The primary battery packs 160 may be able to deliver power faster than the photovoltaic panels 180 or the motor/generator 170, so the controller 200 may be configured to supply power from the batteries to the higher demand loads when possible, while lower demand loads can be charged by the photovoltaic panels 180, for example, while the ZTRs are in use.

In some embodiments, the photovoltaic panels 180 may be coupled to a photovoltaic control system that controls the delivery of power generated by the solar panels. In some embodiments, the photovoltaic control system may be integrated into the controller 200. The photovoltaic control system may enable simultaneous DC and AC coupling. Thus, the power generated by the photovoltaic panels 180 may simultaneously provide AC power to the controller 200 and DC power to the primary battery packs 160. For example, the AC power supplied to the controller 200 may be used to charge equipment battery packs 150. The photovoltaic control system may be configured to convert the power required for the AC equipment battery pack 150 chargers using an inverter. Any excess power generated by the photovoltaic panels 180 that cannot be delivered to the equipment battery packs 150 (e.g., due to charging rate limitations or fully charged equipment battery packs 150) may be delivered as DC power to the primary battery packs 160. The photovoltaic control system may allow the excess DC power to bypass the inverter and be supplied to the primary battery packs 160. In some embodiments, the motor/generator 170 operating in generator mode may be coupled to a generator input breaker in the photovoltaic control system. For example, the photovoltaic control system may include two generator inputs, one of which receives power from the photovoltaic panels 180 and another that received power from the motor/generator 170. The power generated by the motor/generator 170 may be converted to DC power using a rectifier included in or coupled to the motor/generator 170 before being input into the generator input of the photovoltaic control system, or may be supplied directly as AC power. In some embodiments, the power generated by the motor/generator 170 may be supplied to the grid input of the photovoltaic control system as AC power. Using the photovoltaic control system, the power generated by the motor/generator 170 may be simultaneously supplied to the AC equipment battery chargers as AC power and to the primary battery packs 160 as DC power.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the charging trailer 100 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A trailer assembly comprising:

a trailer comprising:

a storage space configured to store outdoor power equipment and a plurality of equipment battery packs, each being configured to power the outdoor power equipment;

a hitch tongue;

a plurality of wheels; and a plurality of receptacles each configured to receive a primary battery pack, wherein the plurality of receptacles are electrically coupled to a wiring system configured to deliver electricity from the primary battery packs to the plurality of equipment battery packs; and a controller wirelessly coupled to a first piece of outdoor power equipment located outside the storage space, wherein the controller is configured to receive a charge status of a first equipment battery pack coupled to the first piece of outdoor power equipment.

2. The trailer assembly of claim 1, wherein an equipment battery pack charging capacity of the trailer is configured to be adjusted by inserting or removing primary battery packs into or out of respective receptacles.

3. The trailer assembly of claim 1, wherein each of the primary battery packs include a capacity that is about 10 kWh.

4. The trailer assembly of claim 1, wherein the controller is further configured to control a flow of electricity from the primary battery packs to the plurality of equipment battery packs.

5. The trailer assembly of claim 1, wherein the primary battery pack has a first voltage and a second equipment battery pack has a second voltage different than the first voltage, wherein a breaker module is configured to convert the power supplied by the primary battery packs to the second voltage before supplying the power to the second equipment battery pack, and wherein the first voltage is greater than or equal to 1.5 times the second voltage.

6. The trailer assembly of claim 5, further comprising a power rail configured to receive power from the primary battery packs at the first voltage, the power rail configured to receive the breaker module configured to convert the first voltage to the second voltage.

7. The trailer assembly of claim 6, wherein the power rail is configured to receive a plurality of breaker modules, wherein the plurality of breaker modules are configured to be coupled to and removable from the power rail without the use of tools.

8. The trailer assembly of claim 1, wherein the trailer further comprises a first motor coupled to and configured to drive a first wheel of the plurality of wheels and a second motor coupled to and configured to drive a second wheel of the plurality of wheels.

9. The trailer assembly of claim 1, wherein the trailer further comprises a dock configured to securably couple the outdoor power equipment in a predetermined position, wherein the predetermined position enables inductive charging of the first equipment battery pack by an inductive charger.

10. The trailer assembly of claim 9, wherein the inductive charger is on a floor of a trailer body.

11. The trailer assembly of claim 9, wherein the dock comprises a plurality of protrusions on a floor of the storage space.

12. A trailer assembly comprising:

a trailer comprising:

a body defining a storage space configured to store outdoor power equipment and a plurality of equipment battery packs, each being configured to power the outdoor power equipment;

a hitch tongue;

a plurality of wheels;

a primary battery pack configured to store electricity and to supply power to the plurality of equipment battery packs to charge the plurality of equipment battery packs; and a battery charge indicator visible from outside of the body, the battery charge indicator configured to indicate a charge status of the primary battery pack; and a controller wirelessly coupled to a first piece of outdoor power equipment located outside the storage space, wherein the controller is configured to receive a charge status of a first equipment battery pack coupled to the first piece of outdoor power equipment.

13. The trailer assembly of claim 12, wherein indicating the charge status of the primary battery pack includes indicating an amount of electricity stored in the primary battery pack relative to a capacity of the primary battery pack.

14. The trailer assembly of claim 12, wherein the battery charge indicator is further configured to indicate when the primary battery pack is being charged.

15. The trailer assembly of claim 12, wherein the controller is communicatively coupled to the battery charge indicator and wherein the battery charge indicator is configured to indicate the charge status of the first equipment battery pack.

16. A trailer assembly comprising:

a trailer comprising:

a body defining a storage space configured to store outdoor power equipment and a plurality of equipment battery packs, each being configured to power the outdoor power equipment;

a hitch tongue;

a plurality of wheels;

a primary battery pack configured to store electricity and to supply power to the plurality of equipment battery packs to charge the plurality of equipment battery packs; and a first motor coupled to and configured to drive a first wheel of the plurality of wheels, wherein the first motor is powered by the primary battery pack; and a controller configured to control a rotational speed of the first motor, the controller being wirelessly coupled to a first piece of outdoor power equipment located outside the storage space, wherein the controller is configured to receive a charge status of a first equipment battery pack coupled to the first piece of outdoor power equipment.

17. The trailer assembly of claim 16, wherein the first motor is a motor-generator that is configured to selectively generate electrical energy that recharges the primary battery pack or the plurality of equipment battery packs.

18. The trailer assembly of claim 16, wherein the primary battery pack is stored in a receptacle in a floor of the body.

19. The trailer assembly of claim 16, wherein the trailer further comprises a battery charge indicator visible from outside of the body, the battery charge indicator configured to indicate at least one of a charge status of the primary battery pack or the charge status of the first equipment battery pack.

* * * * *